United States Patent
Tijsma et al.

[11] Patent Number: 6,139,597
[45] Date of Patent: *Oct. 31, 2000

[54] CONTROLLED RELEASE FERTILIZER COMPOSITIONS AND PROCESSES FOR THE PREPARATION THEREOF

[75] Inventors: Edze Jan Tijsma, Maastricht; Johannes Gijsbertus Antonius Terlingen, Landgraaf; Hendrikus Gijsbertus Adrianus van Kaathoven, Nieuwstadt, all of Netherlands

[73] Assignee: OMS Investments, Inc., Wilmington, Del.

[*] Notice: This patent is subject to a terminal disclaimer.

[21] Appl. No.: 09/172,055

[22] Filed: Oct. 14, 1998

[51] Int. Cl.[7] .............................. A01N 25/00; C05B 7/00
[52] U.S. Cl. ..................... 71/64.11; 71/34; 71/64.07; 71/64.13
[58] Field of Search .............................. 71/64.07, 64.11, 71/64.13, 34

[56] References Cited

U.S. PATENT DOCUMENTS

| | | |
|---|---|---|
| 3,223,518 | 12/1965 | Hansen . |
| 4,019,890 | 4/1977 | Fujita et al. . |
| 4,042,366 | 8/1977 | Fersch et al. . |
| 4,549,897 | 10/1985 | Seng et al. . |
| 4,636,242 | 1/1987 | Timmons . |
| 4,657,576 | 4/1987 | Lambie . |
| 4,704,160 | 11/1987 | McVey et al. ............................ 71/92 |
| 4,880,445 | 11/1989 | Blank . |
| 5,186,732 | 2/1993 | Thompson et al. . |
| 5,405,426 | 4/1995 | Timmons et al. . |
| 5,435,821 | 7/1995 | Duvdevani et al. ........................ 71/28 |
| 5,652,196 | 7/1997 | Luthra et al. . |

OTHER PUBLICATIONS

Controlled Release Fertilizers with Polyolefin Resin Coating, edited by Sadao Shoji and Ambrosio T. Gandeza, Konno PrintingCo., Ltd. Sendai, Japan, 1992, p. 30.

*Primary Examiner*—Steven P. Griffin
*Assistant Examiner*—Eileen E. Nave
*Attorney, Agent, or Firm*—Jones, Day, Reavis & Pogue

[57] ABSTRACT

A controlled release fertilizer is provided which exhibits a Gaussian nutrient release rate pattern. The fertilizer composition includes a granular nutrient core material having a single layer coating of a substantially water-insoluble, uniform, substantially continuous polymer film thereon. Processes are also provided for producing the fertilizer compositions. Methods are also provided for treating plants with the fertilizer compositions.

22 Claims, 2 Drawing Sheets

CONTROLLED RELEASE FERTILIZER COMPOSITIONS AND PROCESSES FOR THE PREPARATION THEREOF

BACKGROUND OF THE INVENTION

1. Field of the Invention

The present invention relates to controlled release fertilizer compositions. More, particularly it relates to fertilizer compositions which exhibit release characteristics such that nutrients release from the fertilizer compositions in accordance with a Gaussian release rate curve essentially matching the growth rate pattern of plants to which the fertilizer is applied. The present invention, also, relates to processes for the preparation of such fertilizer compositions. Furthermore, this invention provides methods for treating a plant under field conditions with a fertilizer which demonstrate a nutrient release pattern matching the growth rate pattern of the treated plant.

2. Description of Related Art

Coated (or encapsulated) fertilizers are known to be very effective sources to provide controlled release of nutrients for the feeding of plants. The nutrients are released at controlled rates through the fertilizer's coating resulting in a sustained feeding of plants. As a result, one application of these so-called controlled release fertilizers can provide the necessary nutrients for a plant that would take multiple applications of soluble fertilizers. One type of coated fertilizer in wide use is sulfur coated fertilizer, such as disclosed in U.S. Pat. Nos. 4,042,366; 4,636,242 and 5,405,426. The release of nutrients from sulfur-coated fertilizers occurs by diffusion through imperfections in the sulfur coating and through coating breakdown. The major advantage of the sulfur coated fertilizers is their relatively low cost.

A second type of controlled release fertilizer utilizes solvent applied polymer coatings. The polymeric materials applied are either thermosetting resins or thermoplastics. Examples of solvent applied thermosetting resin coated fertilizers which are currently in use are disclosed in U.S. Pat. Nos. 3,223,518; 4,657,576 and 4,880,455; whereas examples of fertilizers having thermoplastic coatings are disclosed in U.S. Pat. No. 4,019,890. Another type of encapsulated fertilizer that exhibits good controlled release properties is latex coated granular fertilizers such as those disclosed in U.S. Pat. Nos. 4,549,897 and 5,186,732. Both solvent and latex applied polymer coated fertilizers offer important benefits over sulfur-coated products in regard to consistency of release rates. The majority of nutrient release is by diffusion through pores in the polymer coating, rather than release through coating imperfections.

The presence of a polymeric coating on controlled release fertilizers allows for a rather uniform and consistent nutrient release, provided that the barrier properties of the polymer are sufficient. However, in general these release fertilizers, after application to a plant, exhibit an initial rapid release of nutrients, followed by a decreasing rate of release during a succeeding period and a constant release at a sufficient level thereafter. Finally, the fertilizer granules become exhausted resulting in a further decrease in release rate. In general, the accumulated nutrient release curves can be characterized mathematically by smooth quadratic (convex) curves. Such quadratic release curves have been transformed into release rate curves showing a continuous decrease in nutrient release.

In practice, this implies that such controlled release fertilizers do not release nutrients in accordance with the specific nutrient requirements for growth of a plant treated with the fertilizer since data available from universities and trial stations indicates that numerous plant growth rate patterns resemble Gaussian type curves as illustrated herein in FIG. 1 which demonstrate that plant growth rate follows a Gaussian pattern over time increasing to a maximum level and then declining therefrom. Accordingly, the desirability of providing fertilizers which exhibit a Gaussian release rate characteristics that match the growth rate pattern of a plant species or a plant variety treated with the fertilizer has been recognized heretofore. Such a release pattern implies that the maximum nutrient release rate from the fertilizer composition will coincide with the time the growth of the plant is highest (i.e., when the demand of the plant is the highest).

By converting Gaussian release rate curves into accumulated release curves, S-type (or sigmoid) curves are obtained. Heretofore, controlled release fertilizers which exhibit release of nutrients according to such S-type curve have required the presence of multiple coatings and/or the incorporation of specific additives in the coating. For example, the text *Controlled Release Fertilizers With Polyolefin Resin Coating*, edited by Sadao Shoji and Ambrosio T. Gandeza, published by Konno Printing Co., Ltd., Sendai, Japan, 1992, at page 30, teaches that multi-layered polyolefin-coated controlled release fertilizers exhibit S-type or sigmoid release curves as a result of the incorporation of specific chemicals in the coating. Products having a first and a second coating showing an S-type release curve are disclosed in U.S. Pat. No. 5,652,196.

However, no controlled release fertilizers comprising a single coating layer applied over a nutrient fertilizer core granule have been known heretofore which release nutrients according to an S-type or sigmoid curve so as to provide nutients to plants treated with the fertilizers in accordance with the specific nutrient requirements of the plants.

SUMMARY OF THE INVENTION

As previously noted, fertilizer products exhibiting Gaussian release rate characteristics would be highly beneficial for a wide range of plants. However, at present, coated fertilizer products which display nutrient release rate according to a Gaussian type curve, are only known based on the application of multiple coatings and/or with specific additives incorporated in the coating. Accordingly, it is a primary object of this invention to provide new and improved controlled release fertilizer compositions which release nutrients according to a Gaussian release rate curve over time and comprise a single coating layer, without any additives incorporated therein, applied over a fertilizer granule. These compositions will be described hereinafter as Gaussian release rate products or intermediates.

Another object of this invention is to provide processes for producing such new and improved single coating layer controlled release fertilizer products which release nutrients according to a Gaussian release rate curve over time.

A further object of this invention is to provide a method for treating a plant species or plant variety with a fertilizer composition displaying a nutrient release rate pattern under field conditions which matches the growth rate pattern of the plant species or plant variety treated with the fertilizer so that the highest nutrient release rate occurs when the demand of the plant is the highest. Mathematically, this implies that the maximum nutrient release rate from the fertilizer composition will coincide with the time the growth of the plant is highest.

The foregoing and other objects of the present invention are achieved by providing a controlled release fertilizer composition comprising:

i) a granular core material including at least one fertilizer nutrient compound, and ii) a substantially water-insoluble coating consisting of a single layer of a uniform, substantially continuous polymer film, having no specific additives incorporated therein, applied on the core material, in which the fertilizer composition is structured to release the fertilizer nutrient compound according to a Gaussian nutrient release rate curve.

The products of the present invention are characterized by the presence of only one layer of coating material, without the presence of specific additives. The fertilizer compositions display a nutrient release rate pattern according to a Gaussian curve. Consequently, the release rate (y) of the compositions can be represented by the equation:

$$y = C \exp(-C'(x-a)^2)$$

in which x is time, a is the mean of all the values of x and C and C' are constants.

It should be noted that when a fertilizer composition is referenced herein as exhibiting a Gaussian nutrient release rate curve, it is meant that after the fertilizer is applied to a plant, the nutrient release rate will only increase until a maximum rate is reached after a specific period of time (i.e., in accordance with the foregoing equation, when x=a the nutrient release rate is highest). Thereafter, the nutrient release rate will decrease until it becomes zero when the nutrient content of the fertilizer composition has been fully exhausted.

The Gaussian release rate fertilizer products of this invention have been found to be useful as fertilizers for specific plants or as a building blocks for producing other fertilizer compositions designed to display a nutrient release rate in accordance with the growth pattern of specific plants (i.e., those plants which demonstrate maximum growth at time x=a in the foregoing equation).

The fertilizer compositions of the present invention may be prepared by performing a standard coating process on a substantially spherical core material or by processing standard coated granular material to obtain substantially spherical granules. Alternatively, the fertilizer compositions of this invention may be produced by a coating process wherein a single layer coating is applied to standard granular material by varying the solids content of the coating material from a lower to a higher solid content over the period of coating application (e.g., by increasing the solids content of a film forming resin from about 50 percent to 60 percent over the period of application of a coating onto a granular core nutrient material).

In a preferred embodiment of this invention, Gaussian release fertilizer compositions are prepared by a process comprising:

i) providing a granular core material comprising at least one water soluble fertilizer compound, and ii) applying a substantially water-insoluble coating consisting of a single layer of a uniform, substantially continuous polymer film on the core material in a manner such that the fertilizer composition is structured to provide a Gaussian nutrient release rate curve with a maximum in nutrient release occurring a specific time after application.

In particular, the granules are coated at a predetermined level in such a way that the nutrient release rate curve of the resulting fertilizer composition matches the growth rate curve of a plant species or variety treated with the fertilizer composition.

According to a further aspect of this invention, it relates to a method for providing a fertilizer composition having a nutrient release rate pattern under practical, field conditions matching the growth rate pattern of a plant species or variety. The method comprises the following steps:

i) determining the growth rate pattern of a plant species or variety to be treated with a fertilizer composition of the present invention, expressed in percent per day as a function of the growth season, ii) determining the maximum in the growth rate pattern of the plant species or variety (i.e., element a in the above described equation), iii) selecting a controlled release fertilizer composition with a nutrient release rate matching the growth rate pattern of the plant species or variety, and iv) applying the fertilizer to the plant species or variety in an amount and under conditions to promote growth of the treated plant species or variety.

This method of treating plants is particularly useful for plant species or varieties which are grown in nursery stock and/or to plant species or varieties which are known to exhibit a Gaussian growth rate curve such as plants belonging to the group of conifers and evergreens.

DETAILED DESCRIPTION OF THE INVENTION

Figure 1:
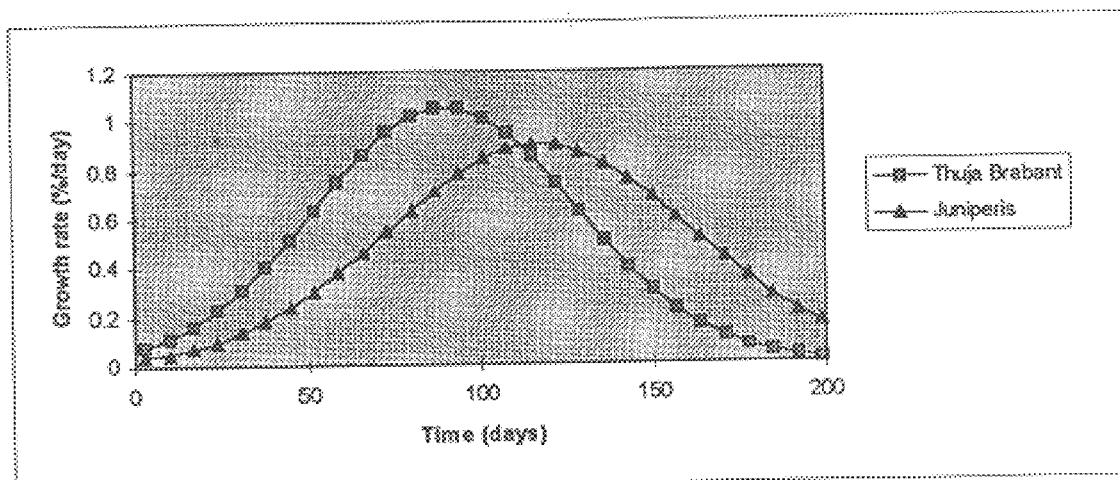
FIG. 1 shows typical growth rate patterns of two plants which exhibit Gaussian growth rate curves (i.e., Thuja Brabant and Juniperis).

The granular core material for use herein may contain any type of fertilizer core compound(s). Known chemical fertilizers including potassium nitrate, potassium sulphate, urea, ammonium nitrate, monopotassium sulfate, ammonium phosphate, or fertilizers obtained from compounding a mixture of these fertilizers can be used. In a preferred embodiment, the fertilizers contain micronutrients or trace elements.

The coating material applied can be based on any kind of material, thermoplastic or thermoset, which is able to form a uniform continuous polymer film.

In the present invention, thermoplastic coating material may comprise:

vinyl resins such as poly(vinyl acetate), poly(vinyl alcohol), poly(vinyl chloride), poly(vinylidene chloride), poly (vinyl pyrrolidone), poly(vinyl acetal), poly(vinyl methylacetamide), polyolefines such as polyethylene, polypropylene, polyisobutylene, styrene-based polymers, acrylic polymers, polyesters such as poly(alkylene terephthalate), poly(caprolactone), poly(oxy alkylene)s, such as poly(ethylene oxide), poly(propylene oxide), cellulose derivatives, such as celluloseacetate, polyamides, polyamines, polycarbonates, polyimides, polysulfones, polysulfides, polysaccharides.

In the present invention, thermosetting coating materials may comprise:

polyesters such as alkyds or modified alkyds, epoxy resins, urethane resins, aminoplastics.

Optionally the coating may comprise non-specific additives (inert fillers), such as talc. The coating material may be applied from solution, or from dispersion. When applied from a solution, use of a solvent in which the resin dissolves at all temperatures is preferred, thus, making it possible to use resin solutions having a relatively high solids content (more than 40% by weight).

The coating may be applied to the fertilizer by a number of methods. However, in a most preferred embodiment of this invention, the coating process is performed in either a coating drum or a fluidized bed, such as a Würster column. The (overall) thickness of the coating(s) applied on the fertilizer granules is preferably between about 5 and 110 μm; and more preferably, between about 25 and 90 μm. Typically, these values correspond to an amount of coating material applied of about 1 to about 20 pph by weight and about 4 to about 15 pph by weight, respectively.

We have found that a specific coating level is required to obtain coated fertilizer compositions displaying a Gaussian nutrient release rate curve, with a maximum in nutrient release occurring at a specific time after application and in accordance with the growth pattern of a treated plant. The coating level which is required by the present invention is obtained with one layer of coating material either by using specific core materials having a particular level of roundness and/or by employing a specific coating procedure as will be described in greater detail hereinafter.

In a preferred embodiment of the present invention, the granular core material has a regular shape, more preferably a substantially spherical shape, which enables the formation of a uniform, substantially continuous polymer film coating. Substantially round, granular core material may be obtained by processing a granular starting material in a spiral separator.

The test employed herein for purposes of determining the roundness or sphericity of the granular core material is based on a particle shape classifier developed by Carpenter and Dietz (Research Paper 2238, 3. of Res. Of the NBS 41(37), September 1951) which was modified for separating spherical and nonspherical granules as follows:

A device consisting of a turntable 20" in diameter was mounted at an angle of 90 with the horizontal. The turntable was rotated at 4 rpm. Granules were fed from a small belt feeder at 11.5 grams/min. onto the edge of the rotating turntable approximately 1" from the center on the counter clockwise side. This low feed rate allowed individual granules to roll on the turntable with a minimum of interference between each other. Spherical granules rolled straight and fell off the bottom of the turntable into a recovery pan. Most nonspherical granules rolled in short irregular parts and tended to stop on the turntable and they were carried around and blown off the turntable into another recovery pan by a stream of air directed parallel to the surface of the turntable.

For this testing, the granules were fed from the feeder into a glass funnel with a 7 mmm opening and short bent at an angle of approximately 100°. The tip of the funnel was no more than ¼" from the edge of the turntable and as close as possible to the turntable without touching. One hundred gram samples were used, and the turntable was cleaned after each sample with glass cleaner to reduce friction. The spherical granules were weighed and, thus, the percent of spherical granules was determined.

When processing a granular starting material in a spiral separator, a product having at least 98% spherical particles or even consisting essentially completely of round particles can be obtained.

In another preferred embodiment of the present invention, standard, previously coated granular material having a substantially spherical shape may be employed to produce the fertilizers of the present invention which exhibit Gaussian nutrient release characteristics. Such coated granules may be obtained by processing standard coated granules in a spiral separator and sphericity of the coated granules is determined by the above-described Carpenter and Dietz test procedure.

For purposes of the present invention, it is preferred to employ core materials and/or coated granular materials containing at least 95 weight percent of round granules or coated granules as determined by the foregoing Carpenter and Dietz test procedures when substantially spherical core materials are required for production of the Gaussian release rate fertilizers of the present invention.

In a further preferred embodiment of the process of the present invention, a polymeric coating material is applied to a granular core as a solution or dispersion of the polymer in a manner such that the rate of application of the polymer coating material is increased over time during the coating step. The rate of application of the polymer material may be increased in various manners. In accordance with this process wherein the amount of liquid coating material applied on the granular core material is varied during the coating process, it is preferred that the core material contain at least 50 weight percent round granules as determined by the Carpenter and Dietz sphericity test procedures in order to achieve the fertilizer compositions of this invention.

In one embodiment of this invention, the polymer content of the solution or dispersion to be used for coating a granular core is increased during the coating step. For example, when using an alkyd resin solution the resin content of the solution is increased from a level of above 45–55% by weight at the beginning of the coating step to about 60–70% by weight at the end of the coating step. In a preferred embodiment the resin content is increased linearly.

In another embodiment, the rate of addition of the polymer solution or dispersion is increased, as opposed to the polymer content, during the coating step.

The following examples illustrate the practice of the invention. All parts are by weight unless otherwise indicated.

EXAMPLE 1

A granular NPK fertilizer comprising about 75% by weight of round particles was processed in a spiral separator prior to the coating process. The composition of the fertilizer was 17% N, 10% $P_2O_5$ and 13% $K_2O$. Furthermore trace elements (Fe, Mn, Zn, Cu, B and MgO) were present in the granule. This fertilizer is abbreviated as 17-10-13+ traces in the following. After processing in the spiral separator, which was designed to separate round versus non-round particles by using momentum generated by rolling particles, the fraction comprising the round particles was used in a coating trial.

10 kg of rounded particles selected for use in the coating trial was placed in a drum coater and heated. After reaching a temperature of 80° C., a solution of a modified unsaturated oil copolymer-based alkyd resin (the copolymer of dicyclopentadiene and alkyd resin from soy bean oil, known as an "Osmocote-coating" as described in U.S. Pat. No. 4,657,576, the disclosure of which is incorporated herein by reference) in white spirit was pumped onto the fertilizer granules by metered dripping of the coating material onto a rotating bed of granules. During the coating process the solids content of the resin in the coating was maintained at a level of about 60 percent. In total, 0.81 kg of solids was added to the fertilizer during the coating process, yielding a coating level of 7.5 pph (parts per hundred on a weight basis). After coating the fertilizer was cooled down to room temperature. The release of the coated (17-10-13+ traces) fertilizer was tested by placing 20 g of this product in 400 ml of water at 21° C. in a closed plastic bottle. At certain time intervals the water was replaced and the conductivity of the solution was measured. The measured conductivity was translated into a total amount of nutrients released using appropriate calibration constants. These calibration constants are specific for a certain type of fertilizer and need to be determined experimentally. However the release can also be measured by measuring the amount of nutrients released by using standard chemical analysis methods.

Figure 2:
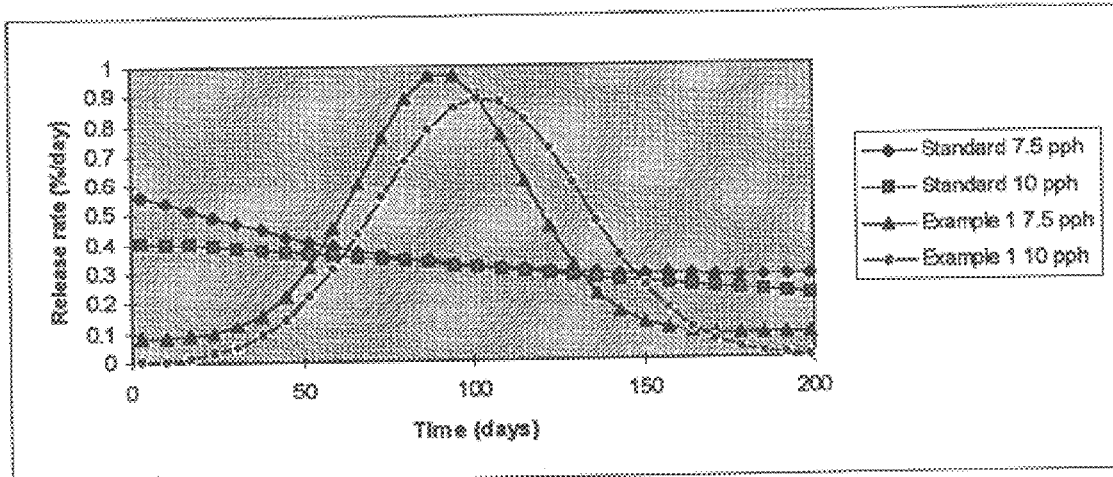
FIG. 2 shows a comparison of the nutrient release rate curves of standard coated 17-10-13+ traces fertilizer compositions having 7.5 and 10 pph coatings applied thereto and of a 17-10-13+ traces fertilizer compositions having the same 7.5 and 10 pph coating weights as the standards except that these fertilizers are produced in accordance with the present invention as detailed in Example 1.

The release rate curve of the 17-10-13+ traces coated and tested using the methods given above, is given in FIG. 2, along with release data of a 7.5 pph coated standard product based on an NPK substrate that was not processed in a spiral separator before coating. As shown in FIG. 2, the time of maximum release rate (the shape of the curve) can be varied according to the plant needs by varying the coating level. When 17-10-13+ traces was coated with a higher coating level (10 pph) using the same procedure the maximum release rate was observed at a later time than was achieved with the 7.5 pph coated product of this invention. To the contrary, a 10 pph standard coated product produced in the same manner as the 7.5 pph coated product exhibited the same non-Gaussian nutrient release pattern as was demonstrated by the 7.5 pph product.

This Example demonstrates the preparation of a controlled release fertilizer compositions which exhibit Gaussian release rate curves which are produced by treating fertilizer granules in a spiral separator prior to the application of an alkyd resin coating thereover.

EXAMPLE 2

A granular NPK fertilizer (17-10-13+ traces), that was not treated in a spiral separator before coating, was coated with an alkyd resin in a coating drum as described in Example 1 to provide fertilizer granules having 7.5 pph coatings. After the fertilizer granules were coated, the coated granules were treated in a spiral separator to separate a fraction consisting of substantially round 7.5 pph coated granules.

Figure 3:
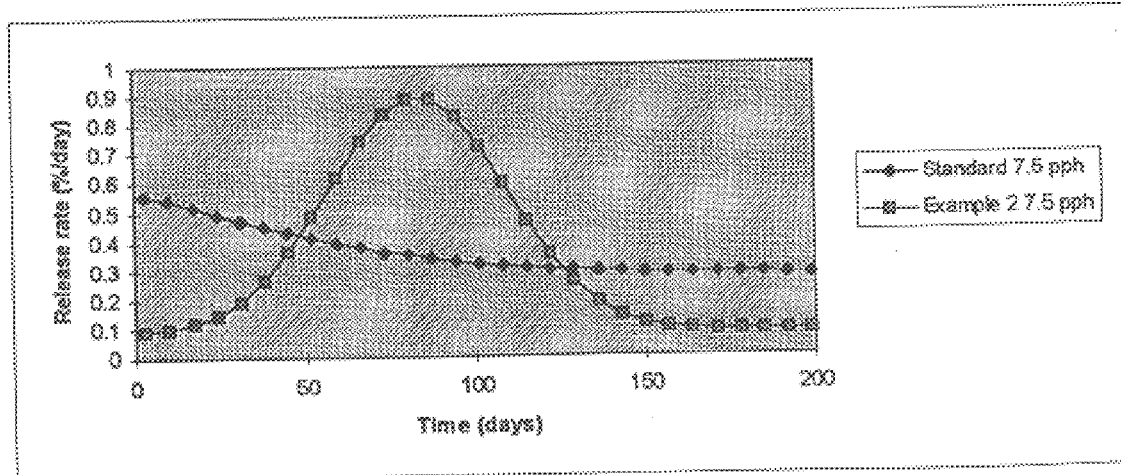
FIG. 3 shows a comparison of the nutrient release rate curves of a standard 7.5 pph coated 17-10-13+ traces fertilizer composition and of a 7.5 pph coated 17-10-13+ traces fertilizer composition produced in accordance with the present invention as detailed in Example 2.

The release of the round fraction as compared with a standard 7.5 pph coated product which was removed before treating in a spiral separator (see FIG. 3) was determined as described in Example 1. It is clear from FIG. 3 that the release rate curve of the product from Example 2 displays a maximum (Gaussian curve), whereas the release rate of the standard product decreases continuously in a non-Gaussian release rate pattern.

EXAMPLE 3

A granular NPK fertilizer (17-10-13+ traces), in which 75 weight percent of the granules were round as determined by the previously described Carpenter and Dietz test procedure, was coated with an alkyd resin in a coating drum. In a drum coater, 10 kg of this product was placed and heated. After reaching a temperature of 80° C., a solution of a modified unsaturated oil copolymer-based alkyd resin (an Osmocote-coating) in white spirit was pumped onto the fertilizer. At the beginning of the coating process, a more dilute solution (i.e., a solution containing less resin solids content) was used than at the end of the coating process. In total, 0.81 kg of solids was added to the fertilizer during the coating process, yielding a coating level of 7.5 pph (parts per hundred on a weight basis). After coating the fertilizer was cooled down to room temperature.

Figure 4:
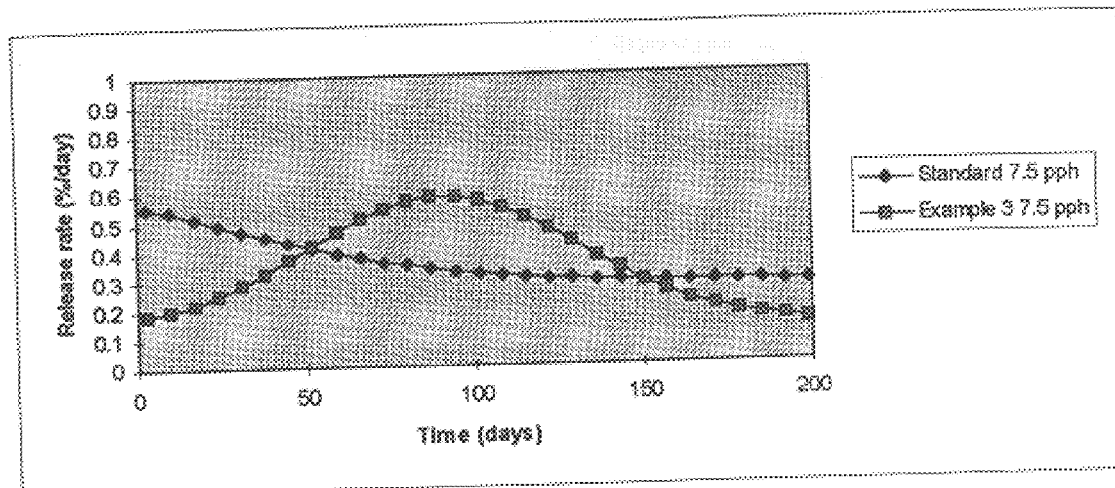
FIG. 4 shows a comparison of the nutrient release rate curves of a standard 7.5 pph coated 17-10-13+ traces fertilizer composition and of a 7.5 pph coated 17-10-13+ traces fertilizer composition produced in accordance with the present invention as detailed in Example 3.

The release rate of nutrients, which was measured as described in Example 1, is illustrated in FIG. 4. For comparison a product coated via a standard procedure with the same coating level (7.5 pph) is shown in FIG. 4. The standard coating procedure is comparable to that given above, except that a standard solids concentration is used during the coating process. The solids concentration is not varied during the coating procedure. It is clear from FIG. 4 that the release rate curves of the products of the present invention display a maximum (Gaussian curve), whereas the release rate of the standard product decreases continuously and does not exhibit a Gaussian release pattern.

EXAMPLE 4

A granular NPK fertilizer (16-10-20) was coated with an acrylic dispersion, useful to obtain a coating with a very low water vapour transmission rate, in a fluidised bed. 9 kg of this granular 16-10-20 fertilizer was added into a pilot-scale fluidised bed Würster-type column and pre-heated during 14 minutes at 70° C. An acrylic dispersion, 3200 g (1250 g on a dry solids basis) was applied to the fluidised NPK granules by spraying from the bottom of the bed at a starting rate of 42 g/minute. The rate of addition was gradually increased to 63 g/minute (after 37 minutes) and subsequently to 84 g/minutes (after 58 minutes). Drying air flow rate was 8 L/minute and entered the bed at a temperature of 70° C. The total coating time was 58 minutes, which was followed by an additional 15 minutes of drying at an air inlet temperature of 70° C. and a 5 minute cooling phase using ambient air resulting in a product having a coating level of 12 pph.

The release of the resulting product was determined as described in Example 1. The release rate data presented in Table 1 shows that a Gaussian type of release was obtained with a maximum in release rate occurring for the product of this example after 38 days.

TABLE 1

Release rate of nutrients of the coated products from Example 4.

| Time (days) | Release Rate (%/day) |
|---|---|
| 3 | 0.07 |
| 10 | 0.07 |
| 17 | 0.09 |
| 24 | 0.42 |
| 31 | 0.72 |
| 38 | 0.75 |
| 45 | 0.67 |
| 59 | 0.59 |
| 73 | 0.48 |
| 87 | 0.40 |
| 101 | 0.32 |
| 115 | 0.28 |
| 129 | 0.23 |
| 143 | 0.20 |
| 157 | 0.17 |
| 171 | 0.17 |

EXAMPLE 5

Figure 5:
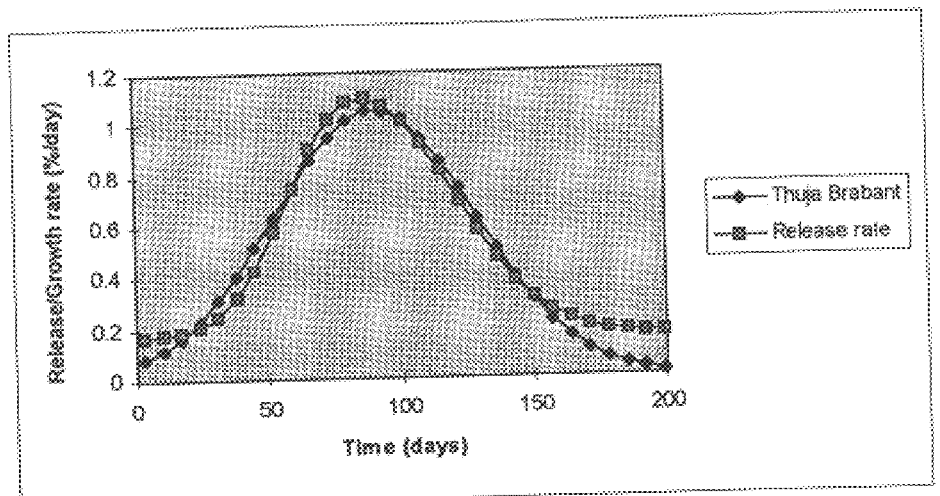
FIG. 5 illustrates the matching of the growth rate of a Thuja Brabant plant in the Netherlands with the release rate of a controlled release fertilizer product of the present invention exhibiting a Gaussian release rate and produced in accordance with the technique set forth in Example 5.

This example is to illustrate the matching of a growth rate pattern of a plant by a nutrient release rate curve of a controlled release fertilizer. In FIG. 5 the growth rate pattern of a Thuja Brabant plant is illustrated together with a nutrient release rate pattern of a product prepared according to the present invention. This particular controlled release fertilizer product was obtained according to a coating process as described in Example 1. As can be seen from the drawing in FIG. 5, the release rate of the coated fertilizer, composition of this invention is substantially identical to the growth rate pattern of the plant.

Although the invention has been described in its preferred forms with a certain degree of particularity, it is to be understood that the present disclosure has been made by way of example only. Numerous changes in the details of the compositions and in the method of their preparation will be apparent without departing from the spirit and scope of the invention, as defined in the appended claims.

What is claimed is:

1. A controlled release fertilizer composition comprising a granular nutrient core material comprising at least one water soluble fertilizer compound, and a substantially water-insoluble coating applied on the core material, the fertilizer composition being structured to provide a Gaussian nutrient release rate curve over time with the maximum of the Gaussian nutrient release rate curve occurring between 1 and 18 months after exposure of the fertilizer composition to moisture; and the coating consisting of a single layer of a uniform, substantially continuous polymer film.

2. The controlled release fertilizer composition according to claim 1, wherein the coating has a thickness of 5 to 110 $\mu$m.

3. The controlled release fertilizer composition according to claim 1 wherein the granular core material has a shape which enables the formation of the uniform, substantially continuous polymer film coating.

4. The controlled release fertilizer composition according to claim 3 wherein at least 95% of the core granules are substantially spherical.

5. The controlled release fertilizer composition according to claim 1 wherein the core granules have substantially smooth outer surfaces.

6. The controlled release fertilizer composition according to claim 1 wherein the core material has a substantially spherical shape.

7. A process for preparing a controlled release fertilizer composition comprising providing a granular nutrient core material comprising at least one water soluble fertilizer compound, and coating the core material with a substantially water-insoluble, single layer of a uniform, substantially continuous polymer film coating, the fertilizer composition being formed in a manner such that nutrient release from the fertilizer composition occurs according to a Gaussian release rate curve over time with the maximum of the Gaussian nutrient release rate curve occurring between 1 and 18 months after exposure of the fertilizer composition to moisture.

8. The process according to claim 7 wherein the single layer coating has a thickness of about 5 to about 110 $\mu$m.

9. The process according to claim 7 wherein the granular nutrient core material has a shape which enables the formation of the uniform, substantially continuous polymer film coating.

10. The process according to claim 9 wherein at least 95% of the core granules are substantially spherical.

11. The process according to claim 10 wherein the substantially spherical, granular core material is prepared by processing granular material in a spiral separator.

12. The process according to claim 7 wherein the core granules have substantially smooth outer surfaces.

13. The process according to claim 12 wherein at least 98% of the coated granules are substantially spherical.

14. The process according to claim 13 wherein the substantially spherical, coated granules are obtained by processing the coated granules in a spiral separator.

15. The process according to claim 12 wherein the coating material is applied from a solution or dispersion of the polymer, and the rate of application is increased during coating of the core material.

16. The process according to claim 15 wherein the polymer content of the solution or dispersion is increased during coating of the core material.

17. The process according to claim 16 wherein the core material is coated with an alkyd resin solution and the resin content of the solution is increased from about 45–55% by weight at the beginning of coating the core material to about 60–70% by weight at the end of coating the core material.

18. The process according to claim 17 wherein the resin content of the solution is increased linearly from the beginning to the end.

19. The process according to claim 15 wherein the rate of addition of the solution or dispersion is increased during coating of the core material.

20. A method for providing a fertilizer composition exhibiting a nutrient release rate pattern matching the growth rate pattern of a plant species or variety treated with the fertilizer composition, the method comprising the steps of:

i) determining the growth rate pattern of the plant species or variety by plotting the growth rate, expressed in percent per day as a function of the growth season, ii) determining the maximum in the growth rate pattern, and iii) selecting a Gaussian nutrient release fertilizer composition with a nutrient release rate curve matching the growth rate pattern, said fertilizer composition comprising a granular nutrient core material comprising at least one water soluble fertilizer compound, and a substantially water-insoluble coating applied on the core material, the fertilizer composition being structured to provide a Gaussian nutrients' release rate curve over time; and the coating consists of a single layer of a uniform, substantially continuous polymer film.

21. The method according to claim 20, wherein, the plant species or variety is grown in nursery stock.

22. The method according to claim 20 wherein the plant species or variety is selected from the group consisting of conifers and evergreens.

* * * * *

UNITED STATES PATENT AND TRADEMARK OFFICE
CERTIFICATE OF CORRECTION

PATENT NO. : 6,139,597
DATED : October 31, 2000
INVENTOR(S) : Edze Jan Tijsma et al.

It is certified that error appears in the above-identified patent and that said Letters Patent is hereby corrected as shown below:

Column 5,
Line 66, change "90" to -- 9° --.

Signed and Sealed this

Fourteenth Day of October, 2003

JAMES E. ROGAN
*Director of the United States Patent and Trademark Office*